United States Patent
Kyusojin et al.

(10) Patent No.: US 7,783,810 B2
(45) Date of Patent: Aug. 24, 2010

(54) APPARATUS AND METHOD OF PROCESSING INFORMATION

(75) Inventors: Hiroshi Kyusojin, Tokyo (JP); Masato Kajimoto, Chiba (JP); Chiaki Yamana, Kanagawa (JP); Kazuyoshi Horie, Tokyo (JP); Taku Tanaka, Hokkaido (JP); Kazutaka Tachibana, Hokkaido (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 121 days.

(21) Appl. No.: 11/669,766

(22) Filed: Jan. 31, 2007

(65) Prior Publication Data

US 2007/0204084 A1  Aug. 30, 2007

(30) Foreign Application Priority Data

Feb. 1, 2006  (JP) ............................ 2006-024647

(51) Int. Cl.
*G06F 13/24* (2006.01)
*G06F 15/16* (2006.01)

(52) U.S. Cl. ...................................... 710/268; 709/250

(58) Field of Classification Search ................. 710/266, 710/267, 268; 709/230, 250
See application file for complete search history.

(56) References Cited

U.S. PATENT DOCUMENTS

| | | | | |
|---|---|---|---|---|
| 6,389,468 | B1 * | 5/2002 | Muller et al. | 709/226 |
| 6,467,008 | B1 * | 10/2002 | Gentry et al. | 710/261 |
| 6,631,422 | B1 * | 10/2003 | Althaus et al. | 709/250 |
| 7,103,693 | B2 * | 9/2006 | Anand et al. | 710/260 |
| 7,126,952 | B2 * | 10/2006 | Hooper et al. | 370/401 |
| 7,177,943 | B1 * | 2/2007 | Temoshenko et al. | 709/237 |
| 7,418,505 | B2 * | 8/2008 | Lim et al. | 709/226 |
| 7,483,340 | B2 * | 1/2009 | Dias | 368/27 |
| 7,529,242 | B1 * | 5/2009 | Lyle | 370/392 |
| 2005/0125582 | A1 * | 6/2005 | Tu et al. | 710/260 |

FOREIGN PATENT DOCUMENTS

JP    2004-252776    9/2004

OTHER PUBLICATIONS

IEEE 802.1Q Standard provided by Wikipedia, undated.*
Multicores Need a distributed Object Model Framework, Dominic Herity, Jan. 16, 2006.*
Making the Most of Multi-Core Processors: Part 1, Robert Craig et al., Mar. 27, 2006.*
Definition of TCP and UDP Port provided by Wikipedia, <http://en.wikipedia.org/wiki/TCP_and_UDP_port>, accessed on Apr. 17, 2009.*

* cited by examiner

*Primary Examiner*—Khanh Dang
(74) *Attorney, Agent, or Firm*—K&L Gates LLP (57) ABSTRACT

An information processing apparatus is provided. Plural processors respectively execute separate operating systems to process data that has been received from a network. The apparatus includes receiving device that receives the data in predetermined units from the network and analyzing device that analyzes identification data added to the data received by the receiving device. The apparatus also includes maintaining device which maintains a table that relates the identification data to information on identification of an interrupt register in each of the processors that execute the operating systems. The apparatus further includes interrupting device that allows interrupt processing to any of the processors to occur by writing the data received with the receiving device into the interrupt register that is related to the identification data, which is identified on the based of the table maintained by the maintaining device, analyzed by the analyzing device.

12 Claims, 7 Drawing Sheets

| IP ADDRESSES | CORRESPONDING SNRS |
|---|---|
| 192.168.0.10 | SNR0 |
| 192.168.0.11 | SNR1 |
| 192.168.0.12 | SNR2 |

| MAC ADDRESSES | CORRESPONDING SNRS |
|---|---|
| 08:00:46:EA:10:BE | SNR0 |
| 08:00:46:D2:02:C2 | SNR1 |
| 08:00:46:54:42:F7 | SNR2 |

| VLAN IDS | CORRESPONDING SNRS |
|---|---|
| 10 | SNR0 |
| 11 | SNR1 |
| 12 | SNR2 |

FIG. 13

FIG. 14

APPARATUS AND METHOD OF PROCESSING INFORMATION

CROSS REFERENCE TO RELATED APPLICATION

The present application claims priority to Japanese Patent Application No. JP2006-24647 filed in the Japanese Patent Office on Feb. 1, 2006, the entire contents of which is being incorporated herein by reference.

BACKGROUND

The present disclosure relates to an apparatus and a method of processing information. More particularly, it relates to an apparatus of processing information such as a computer terminal and the like in which plural processors respectively execute separate operating systems to process data received from a network, whereby the data is accurately received without influencing any processing by another processor or operating system.

With the acceleration in processing speed of processors and the like, plural virtual computers have been gradually implemented to operate on a single physical computer in recent years. In such computers, any separate operating systems (OSS) are respectively executed on the virtual computers, as a general rule.

Thus, if a computer or the like in which one central processing unit (CPU) executes plural operating systems communicates to another computer or the like, it is necessary to judge which of operating systems data such as packets received from the network or the like is be exactly available for.

Japanese Patent Application Publication No. 2004-252776 has proposed such a technology that by using IP addresses, MAC addresses and the like, an operating system for which the received packet is available is identified.

Figure 1:
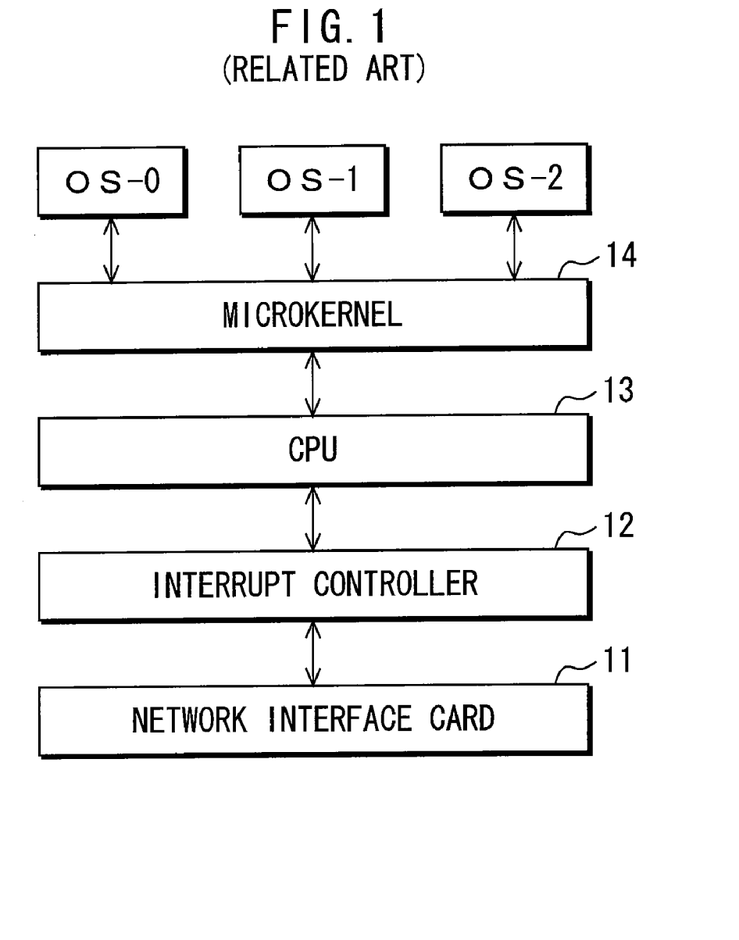
FIG. 1 is a block diagram for showing a functional configuration of a part of performing any reception processing on packets in the computer in which one CPU executes plural operating systems as a related art.

FIG. 1 shows a functional configuration of a part of performing any reception processing on packets in the computer in which one CPU executes plural operating systems. The following describes a case where an operating system for which the received packet is available is identified by using IP addresses.

In FIG. 1, a network interface card 11 acquires a signal from the network or the like through a communication medium and receives a frame of data (for example, Ethernet (trademark) frame) that is available for the network interface card 11. The network interface card 11 then notifies an interrupt controller 12 of an interrupt.

CPU 13 performs the interrupt processing under the control of the interrupt controller 12. In this moment, a microkernel 14 constituted of software and the like that are performed by the CPU 13 analyzes an IP address based on the data stored in the frame that has received by the network interface card 11 to identify an operating system for which the received frame data (packet) is available. In such the case, the operating system is identified with, for example, a table shown in FIG. 2 or the like being referred.

Figure 2:
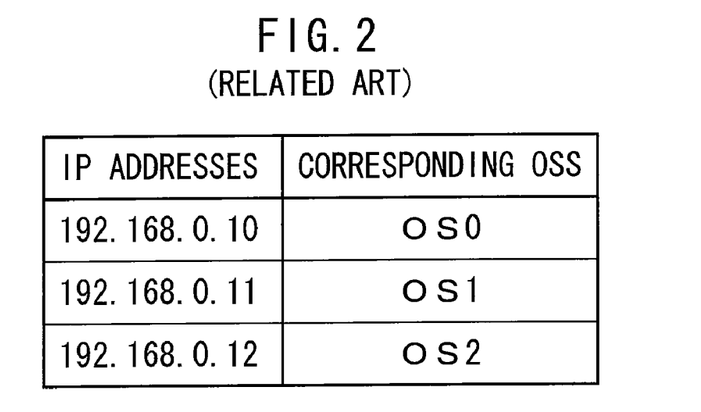
FIG. 2 is a table for showing a correspondence between the operating systems used in the configuration shown in FIG. 1 and the IP addresses.

FIG. 2 shows an example of the table in which the IP addresses correspond to previously determined operating systems (OSS). In the example, an IP address of 192.168.0.10 corresponds to OS0; an IP address of 192.168.0.11 corresponds to OS1; and an address of 192.168.0.12 corresponds to OS2.

Thus, the received packet data is supplied to any of the identified operating systems, OS0, OS1, and OS2.

Figure 3:
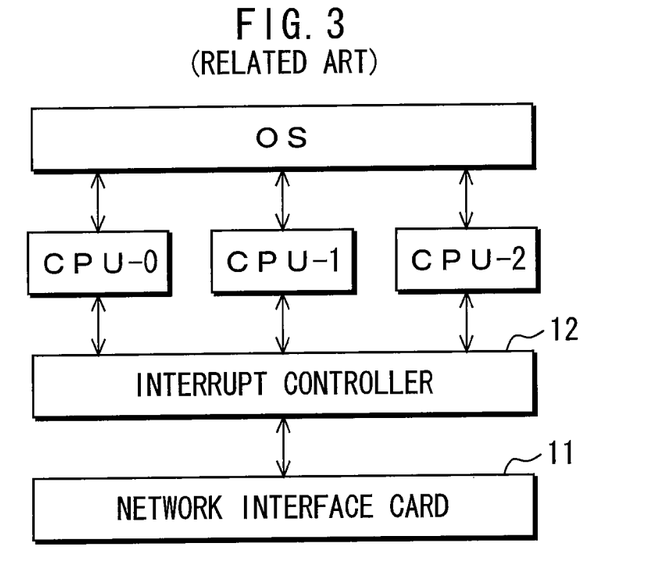
FIG. 3 is a block diagram for showing a functional configuration of a part of performing any reception processing on packets in a computer in which plural CPUS execute a single operating system as the related art.

Further, an apparatus for processing information having plural processors has recently spread out. FIG. 3 shows a functional configuration of a part of performing any reception processing on packets in the computer containing plural processors.

In an example shown in FIG. 3, CPU-0, CPU-1, and CPU-2 execute a single operating system (OS). The network interface card 11 receiving a frame data (for example, Ethernet (trademark) frame) that is available for the network interface card 11 notifies the interrupt controller 12 of an interrupt. Any one of the CPU-0, CPU-1, and CPU-2 then receives the packet. In this moment, the CPU to receive the packet may be selected based on a systems such as a round robin, the CPU having the heaviest load may be selected or the predetermined CPU may receive the packet continually.

Figure 4:
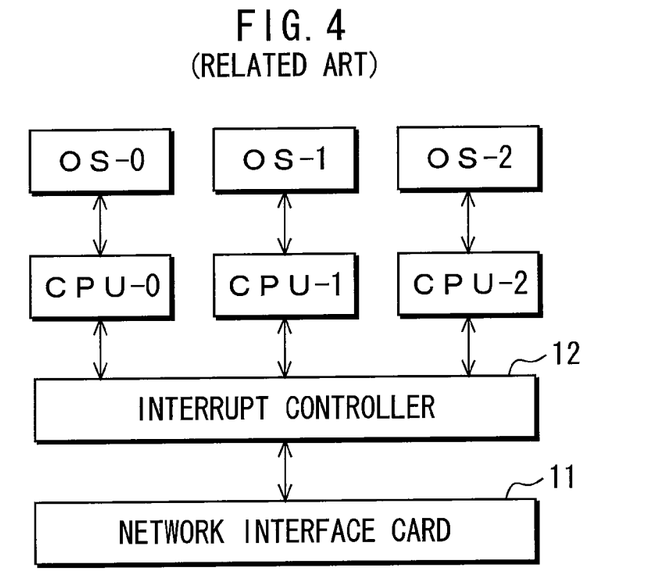
FIG. 4 is a block diagram for showing a functional configuration of a part of performing any reception processing on packets in a computer in which plural CPUS respectively execute the separate operating systems as the related art.

As shown in FIG. 4, however, in an apparatus of processing information in which plural CPUS (CPU-0, CPU-1, and CPU-2) respectively execute the separate operating systems (OS-0, OS-1, and OS-2), even if a CPU selected based on the round robin is notified of the interrupt, the operating system for which this packet is actually available may have been already executed by another CPU. In order to avoid such a case, it is necessary to previously perform any processing to analyze which of the operating systems the packet is available for before the CPU is notified of the interrupt. However, it is difficult to receive data accurately from a network without influencing any processing by another processor or operating system in the apparatus of processing information in which plural CPUS respectively execute the separate operating systems.

It is desirable to provide an apparatus of processing information and the like in which plural processors respectively execute separate operating systems, whereby the data is accurately received without influencing any processing by another processor or operating system.

SUMMARY

According to an embodiment, there is provided an apparatus of processing information in which plural processors respectively execute separate operating systems to process data that has been received from a network. The apparatus includes a receiving device that receives the data in predetermined units from the network and analyzing device that analyzes identification data added to the data received by the receiving device. The apparatus also includes a maintaining device that maintains a table that relates the identification data to information on identification of an interrupt register in each of the processors that execute the operating systems. The apparatus further includes an interrupting device that allows interrupt processing to any of the processors to occur by writing the data received with the receiving device into the interrupt register that is related to the identification data, which is identified on the based of the table maintained by the maintaining device, analyzed by the analyzing device.

The data received by the receiving device may include the IP packet and the identification data may include a destination IP address of the IP packet.

The data received by the receiving device may include a frame in a data link layer and the identification data may include a destination media access control (MAC) address of the frame.

The data received by the receiving device may include a frame of Ethernet (trademark), which is suitable for IEEE 802.1Q standard, and the identification data may include a virtual local area network (VLAN) identification (ID) contained in a tag of the frame.

The plural processors respectively execute a single operating system to perform separate processes and the maintaining device may maintain a table that relates the identification data to information on identification of an interrupt register in each of the processors that perform the processes.

According to another embodiment, there is provided a method of processing information for an apparatus of processing information in which plural processors respectively execute separate operating systems to process data that has been received from a network. The method contains the steps of receiving the data in predetermined units from the network, analyzing identification data added to the data received by the receiving device, identifying the interrupt register that is related to the analyzed identification data based on a table that relates the identification data to information on identification of an interrupt register in each of the processors that execute the operating systems, and allowing interrupt processing to any of the processors to occur by writing the received data into the identified interrupt register.

According to another embodiment, there is provided a computer-readable program product that allows to carry out the above method of processing information an apparatus of processing information in which plural processors respectively execute separate operating systems to process data that has been received from a network.

In the above embodiments, the data is received in predetermined units from the network and identification data added to the received data is analyzed. Based on the table that relates the identification data to information on identification of an interrupt register in each of the processors that execute the operating systems, the interrupt register that is related to the analyzed identification data is then identified. Writing the received data into the identified interrupt register allows the interrupt processing to any of the processors to occur.

According to the above embodiments, in the apparatus of processing information wherein plural processors respectively execute separate operating systems, any processor or any operating system in the apparatus can receive data accurately from the network without influencing any processing by another processor or operating system.

Additional features and advantages are described herein, and will be apparent from, the following Detailed Description and the figures.

DETAILED DESCRIPTION

Figure 5:
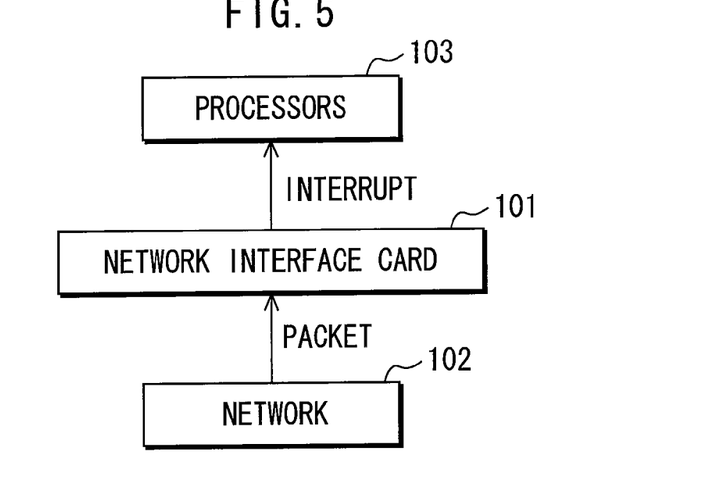
FIG. 5 is a block diagram for showing an application example of a network interface card according to an embodiment.

The following describes the embodiments with reference to the accompanying drawings. FIG. 5 shows an application example of a network interface card 101 according to an embodiment.

As shown in FIG. 5, the network interface card 101 is used so that it can be inserted into a computer terminal such as a personal computer or a server. The network interface card 101 is connected to a network 102, for example, Ethernet (trademark), by connecting any communication medium, such as a cable, to itself. The network interface card 101 then acquires a signal from the network 102.

The network interface card 101 also receives data such as Ethernet frame and the Internet protocol (IP) packet that is suitable for being received by the computer terminal into which the network interface card 101 is inserted, out of the data corresponding to the signal acquired from the network 102. When the computer terminal into which the network interface card 101 is inserted receives the data to be received, the network interface card 101 notifies processors 103 in the computer terminal of an interrupt through an internal bus or the like, which is not shown.

The processors 103 perform various kinds of processing in the computer terminal into which the network interface card 101 is inserted. When any of the processors 103 receive the interrupt from the network interface card 101, it (they) control (s) any parts constituting the computer terminal so that the data received from the network interface card 101 can be transmitted to a predetermined area in a memory (not shown).

The network interface card 101 as an embodiment of an apparatus of processing information is configured so that it can be inserted into a computer terminal that adopts a multi-core high performance processor architecture such as Cell broadband engine™ architecture. In the computer terminal or the like that adopts a high performance multi-core processor architecture such as Cell broadband engine (trademark) architecture, plural processors may execute separate operating systems respectively.

Figure 6:
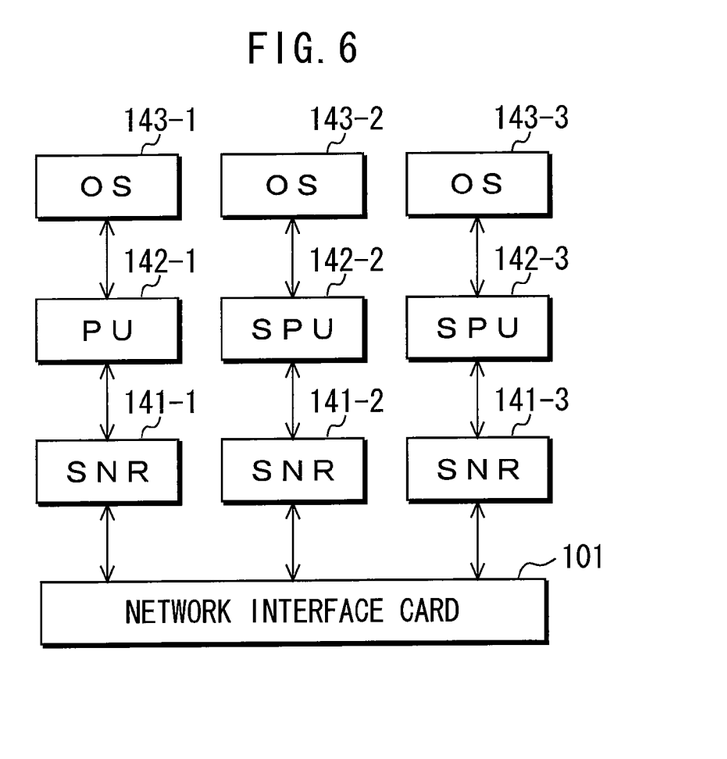
FIG. 6 is a block diagram for showing a computer terminal in which plural processors respectively execute the separate operating systems and into which the network interface card shown in FIG. 5 is incorporated.

FIG. 6 shows a configuration of the computer terminal that adopts the Cell Broadband engine (trademark) architecture and a relationship between the computer terminal and the network interface card 101 incorporated thereinto. In this computer terminal, processing unit (PU) 142-1 and synergitic processing units (SPU) 142-2, 142-3 are illustrated as the plural processors (three processors in this embodiment). The PU 142-1, the SPU 142-2, and the SPU 142-3 respectively execute operating systems (OSS) 143-1, 143-2, and 143-3. Namely, plural processors respectively execute separate operating systems.

In the computer terminal that adopts the Cell broadband engine (trademark) architecture, signal notification register (SNR) that is a register for synchronizing the processors with each other or each of the processors with each device inserted into the computer terminal is provided for each of the processors. In this embodiment, each of the signal notification registers SNR 141-1, 141-2, and 141-3 is provided for the PU 142-1, the SPU 142-2, and the SPU 142-3.

For example, if various kinds of devices that are inserted into the computer terminal interrupt a predetermined processor(s), data representing that the interrupt occurs or the like is written into an SNR(S) corresponding to the processor(s) to be interrupted. The processor(s) corresponding to the SNR(S) perform(s) any interrupt processing such that data received from the device(s) can be transmitted to a predetermined area in a memory, not shown, based on the data written in the SNR(S).

In a computer terminal in which plural processors respectively execute separate operating systems, if the network interface card 101 receives the data, it is necessary to previously identify which of operating systems the received data is available for before the processors have been notified of the interrupt. Thus, according to an embodiment, by referring to table shown in FIG. 7, the network interface card 101 previously identifies which of operating systems the received data is available for.

It is assumed that separate IP addresses are respectively applied to the operating systems OS 143-1, OS 143-2, and OS 143-3. Namely, it is assumed that IP address, "192.168.0.10" is applied to the operating system OS 143-1; IP address, "192.168.0.11" is applied to the operating system OS 143-2; and IP address, "192.168.0.12" is applied to the operating system OS 143-3.

Figure 7:
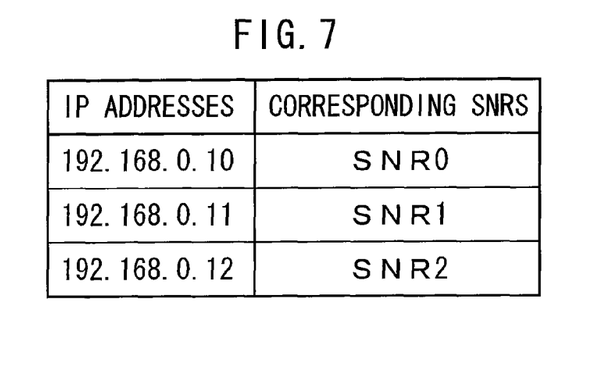
FIG. 7 is a table for showing a correspondence between SNRS used in the configuration shown in FIG. 6 and the IP addresses.

FIG. 7 shows an example of the table indicating a correspondence between IP addresses and SNRS. In FIG. 7, SNR0, SNR1, and SNR2 are identifications for identifying the SNR 141-1, the SNR 141-2, and the SNR 141-3 shown in FIG. 6, respectively. The IP address, "192.168.0.10" corresponds to the SNR0. The IP address, "192.168.0.11" corresponds to the SNR1. The IP address, "192.168.0.12" corresponds to the SNR2.

Thus, by referring to the table shown in FIG. 7, the network interface card 101 identifies SNR(S) corresponding to the received data (IP packet in this embodiment). This allows the apparatus of processing information to receive the data accurately from the network without influencing any processing by another processor or operating system.

Figure 8:
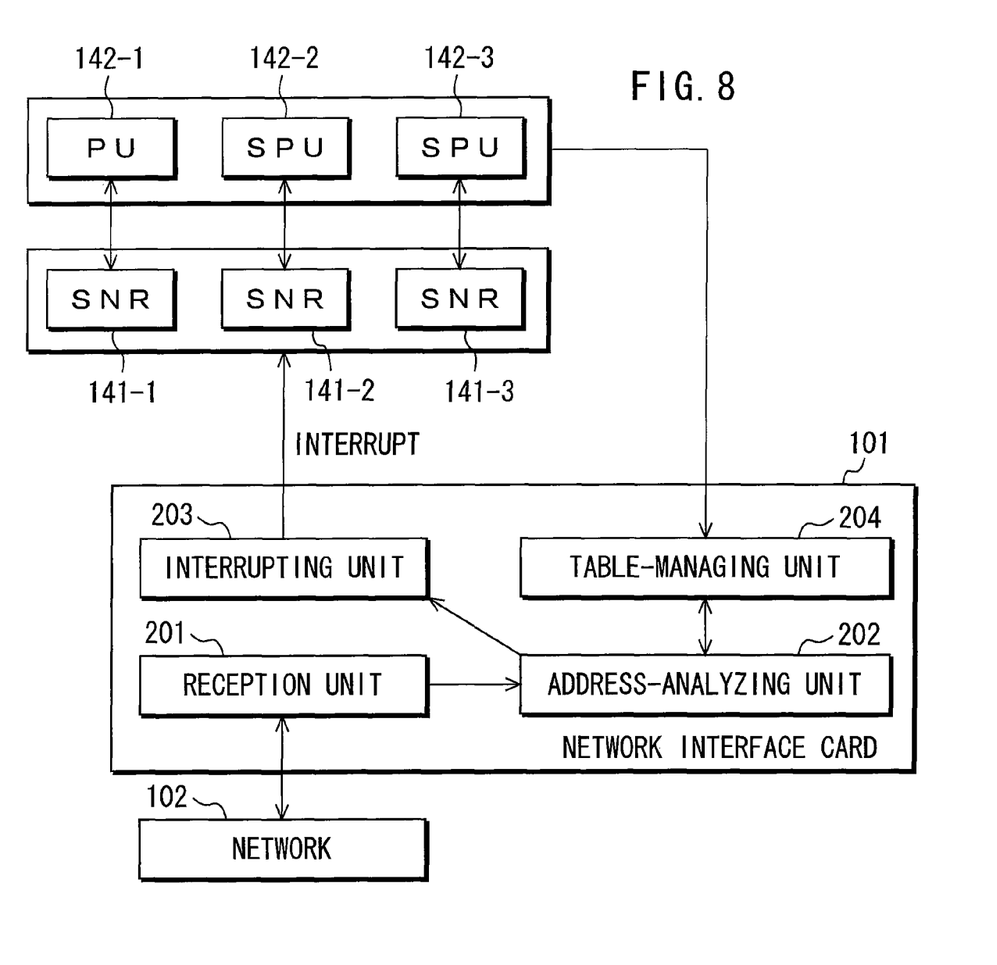
FIG. 8 is a block diagram for showing a functional configuration of the network interface card according to the embodiment.

FIG. 8 shows a functional configuration of the network interface card 101.

The network interface card 101 contains a reception unit 201, an address-analyzing unit 202, an interrupting unit 203, and a table-managing unit 204.

The reception unit 201 acquires a signal from the network 102 and receives the data such as Ethernet frame and the IP packet that is suitable for being received by the computer terminal into which the network interface card 101 is inserted, out of the data corresponding to the signal acquired from the network 102.

The address-analyzing unit 202 checks a destination IP address of the data (IP packet in this embodiment) received by the reception unit 201 and searches a table stored in the table-managing unit 204.

Thus, the table-managing unit 204 stores, for example, the table relating IP addresses to the SNRS as shown in FIG. 7. The table-managing unit 204 receives IP addresses each applied to the OS executed by each of the processors and any information on ID of SNR set on each of the processors to produce and update the table to be stored.

The interrupting unit 203 notifies a predetermined SNR(S) of reception of the IP packet to allow the interrupt to occur based on an instruction from the address-analyzing unit 202. Namely, the interrupting unit 203 writes the data representing that the interrupt from the network interface card 101 occurs or the like into any of the SNRS (for example, the SNR 141-3) corresponding to the ID (for example, SNR2) identified based on the table that is stored in the table-managing unit 204. The processor(s) (for example, the SPU 142-3) corresponding to the SNR(S) perform(s) the interrupt processing to transmit the data received by the reception unit 201 to a predetermined area in a memory, not shown, based on the data written into the SNR(S).

Figure 9:
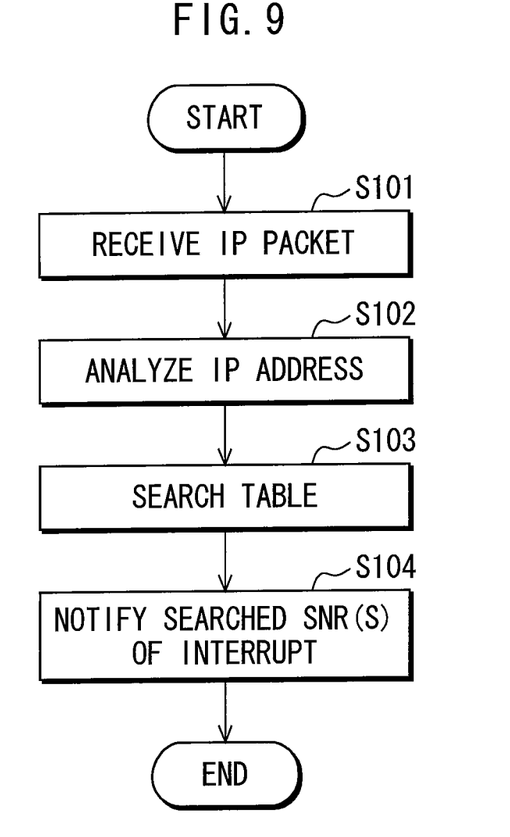
FIG. 9 is a flowchart for explaining a processing example of notifying SNR(S) of an interrupt while referring to the table shown in FIG. 7.

FIG. 9 is a flowchart for explaining an example of the interrupt processing by the network interface card 101.

At step S101, the reception unit 201 acquires the signal from the network 102 and receives the data such as the IP packet that is suitable for being received by the computer terminal into which the network interface card 101 is inserted, out of the data corresponding to the signal acquired from the network 102.

At step S102, the address-analyzing unit 202 analyzes the destination IP address of the IP packet received by the reception unit 201.

At step S103, the address-analyzing unit 202 searches the table stored in the table-managing unit 204. In this moment, by referring to, for example, the table shown in FIG. 7, ID(S) of SNR(S) corresponding to the IP address analyzed at the step S102 is (are) searched and the searched ID(S) of SNR(S) is (are) supplied to the interrupting unit 203.

At step S104, the interrupting unit 203 notifies the SNR(S) identified based on the ID(S) of SNR(S) searched at the step S103 of reception of the IP packet to allow the interrupt to occur.

Such the interrupt processing allows the predetermined processor(s) or operating system(s) to receive data accurately from the network without influencing any processing by another processor or operating system.

Although an embodiment in which separate IP addresses are respectively applied to the OS 143-1, the OS 143-2, and the OS 143-3 has been described, separate MAC addresses can be respectively applied to the OS 143-1, the OS 143-2, and the OS 143-3. In this embodiment, the table produced, updated, and stored in the table-managing unit 204 can be organized as the one shown in FIG. 10.

Figure 10:
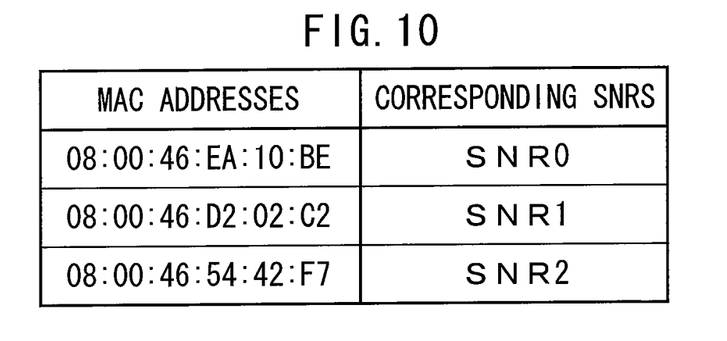
FIG. 10 is a table for showing a correspondence between SNRS used in the configuration shown in FIG. 6 and the MAC addresses.

FIG. 10 shows an example of the table indicating a correspondence between MAC addresses and SNRS. In FIG. 10, SNR0, SNR1, and SNR2 respectively are identifications for identifying the SNR 141-1, the SNR 141-2, and the SNR 141-3 shown in FIG. 6. The MAC address, "08:00:46:EA:10: BE" corresponds to the SNR0. The MAC address, "08:00:46:

D2:02:C2" corresponds to the SNR1. The MAC address, "08:00:46:54:42: F7" corresponds to the SNR2.

Similar to the above embodiment referring to the table shown in FIG. 7, by referring to the table shown in FIG. 10, the network interface card 101 identifies SNR(S) corresponding to the received data (frame of Ethernet (trademark) or the like in this embodiment), so that the apparatus of processing information can receive the data accurately from the network without influencing any processing by another processor or operating system. However, in the above embodiment referring to the table shown in FIG. 7, it is necessary to analyze the address of packet in the network layer while in the embodiment shown in FIG. 10, it is necessary to analyze only the address of the frame in the data link layer that is lower layer than the network layer. This enables any applied load to be reduced as compared with the embodiment shown in FIG. 7.

Figure 11:
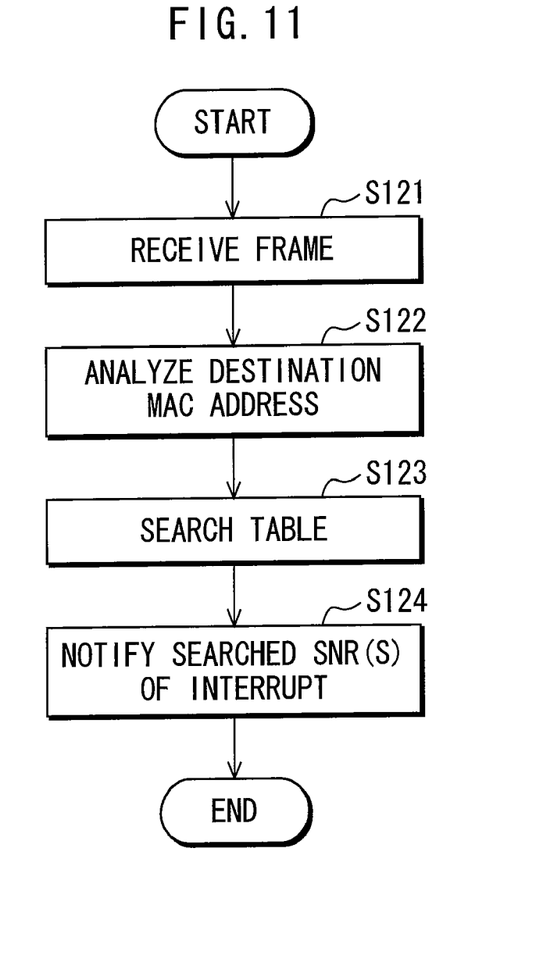
FIG. 11 is a flowchart for explaining a processing example of notifying SNR(S) of an interrupt while referring to the table shown in FIG. 10.

FIG. 11 is a flowchart for explaining an example of the interrupt processing by the network interface card 101, which corresponds to the embodiment shown in FIG. 10.

At step S121, the reception unit 201 acquires the signal from the network 102 and receives the data such as the frame of the Ethernet (trademark) that is suitable for being received by the computer terminal into which the network interface card 101 is inserted, out of the data corresponding to the signal acquired from the network 102.

At step S122, the address-analyzing unit 202 analyzes the destination MAC address of the frame received by the reception unit 201.

At step S123, the address-analyzing unit 202 searches the table stored in the table-managing unit 204. In this moment, by referring to, for example, the table shown in FIG. 10, ID(S) of SNR(S) corresponding to the MAC address analyzed at the step S122 is (are) searched and the searched ID(S) of SNR(S) is (are) supplied to the interrupting unit 203.

At step S124, the interrupting unit 203 notifies the SNR(S) identified based on the ID(S) of SNR(S) searched at the step S123 of reception of the frame to allow the interrupt to occur.

Such the interrupt processing allows the predetermined processor(s) or operating system(s) to receive data accurately from the network without influencing any processing by another processor or operating system.

Alternatively, if the network 102 is a network corresponds to IEEE802.1Q standard, separate virtual local area network (VLAN) IDS may be applied to the OS 143-1, the OS 143-2, and the OS 143-3. It is to be noted that the IEEE802.1Q standard is a standard relative to virtual LAN constituted of, for example, a switching hub. In communication data transmitted to or received from any network equipment having specification applied to IEEE802.1Q, a field of "Tag" is inserted between a field, "Source Address" in the Ethernet frame and a field, "Type" therein. Based on VLAN ID included in the field of "Tag", a virtual LAN (VLAN) to which this frame belongs is identified.

Figure 12:
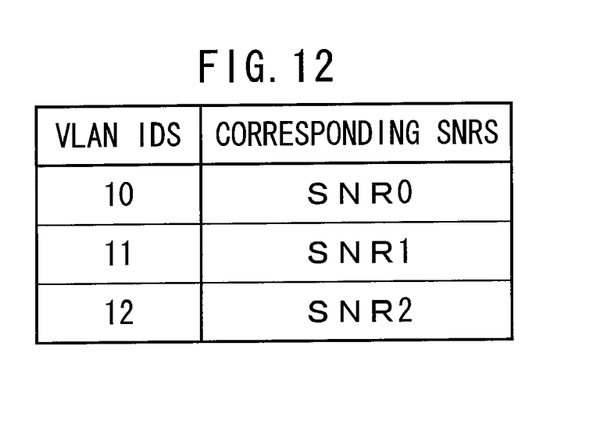
FIG. 12 is a table for showing a correspondence between SNRS used in the configuration shown in FIG. 6 and the virtual local area network (VLAN) identification numbers (IDS)

When the separate VLAN IDS are respectively applied to the OS 143-1, the OS 143-2, and the OS 143-3, the table produced, updated, and stored in the table-managing unit 204 can be organized as the one shown in FIG. 12.

FIG. 12 shows an example of the table indicating a correspondence between VLAN IDS and SNRS. In FIG. 12, SNR0, SNR1, and SNR2 respectively are identifications for identifying the SNR 141-1, the SNR 141-2, and the SNR 141-3 shown in FIG. 6. The VLAN ID, "10" corresponds to the SNR0. The VLAN ID, "11" corresponds to the SNR1. The VLAN ID, "12" corresponds to the SNR2.

Figure 13:
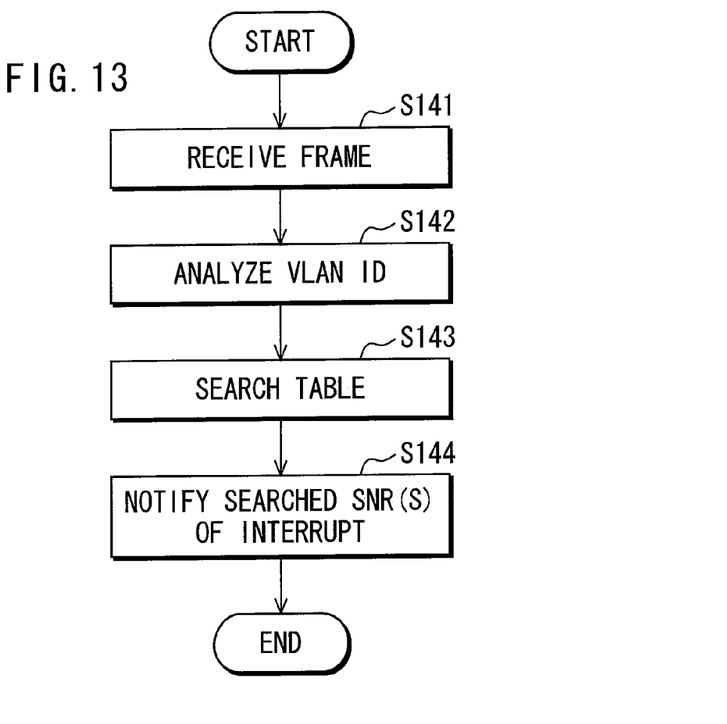
FIG. 13 is a flowchart for explaining an example of notifying SNR(S) of an interrupt while referring to the table shown in FIG. 12.

FIG. 13 is a flowchart for explaining an example of the interrupt processing by the network interface card 101, which corresponds to the embodiment shown in FIG. 12.

At step S141, the reception unit 201 acquires the signal from the network 102 and receives the data such as the frame of Ethernet (trademark) that is suitable for being received by the computer terminal into which the network interface card 101 is inserted, out of the data corresponding to the signal acquired from the network 102.

At step S142, the address-analyzing unit 202 analyzes the VLAN ID of the frame received by the reception unit 201.

At step S143, the address-analyzing unit 202 searches the table stored in the table-managing unit 204. In this moment, by referring to, for example, the table shown in FIG. 12, ID(S) of SNR(S) corresponding to the VLAN ID analyzed at the step S142 is (are) searched and the searched ID(S) of SNR(S) is (are) supplied to the interrupting unit 203.

At step S144, the interrupting unit 203 notifies the SNR(S) identified based on the ID(S) of SNR(S) searched at the step S143 of reception of the frame to allow the interrupt to occur.

Such the interrupt processing allows the predetermined processor(s) or operating system(s) to receive data accurately from the network without influencing any processing by another processor or operating system.

Although the embodiments in which separate IP addresses, MAC addresses or VLAN IDS are respectively applied to the plural operating systems have been described, this invention is applicable to a case where separate IP addresses, MAC addresses or VLAN IDS can be respectively applied to plural processes to be executed in a single operating system.

Figure 14:
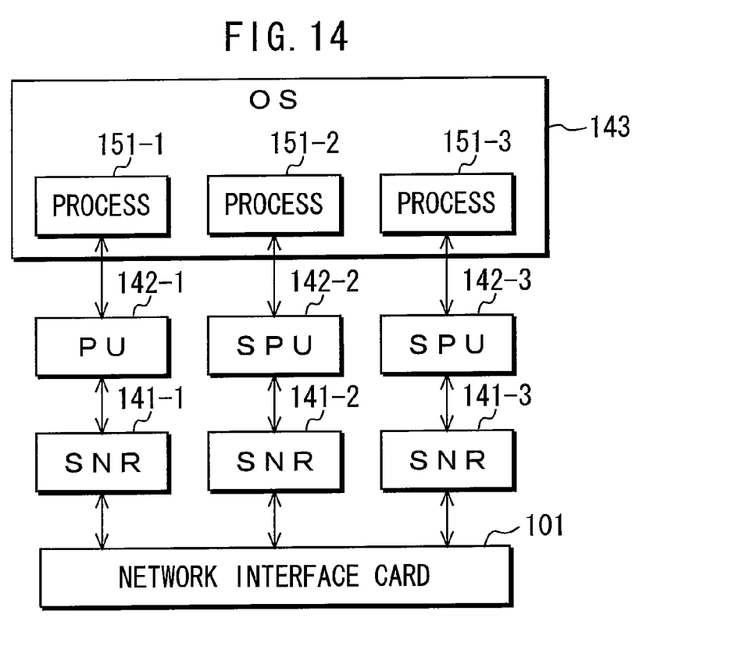
FIG. 14 is a block diagram for showing a computer terminal in which plural processors execute a single operating system to perform separate processes respectively and into which the network interface card shown in FIG. 5 is incorporated.

For example, in a computer terminal that adopts the Cell broadcast engine (trademark) architecture, as shown in FIG. 14, the PU 142-1, the SPU 142-2, and the SPU 142-3 execute the single operating system OS 143 in which processes 151-1, 151-2, and 151-3 are executed.

If separate IP addresses, MAC addresses or VLAN IDS are respectively applied to the processes 151-1, 151-2, and 151-3 even in a case shown in FIG. 14, the embodiments are applicable thereto. In this moment, IP addresses, MAC addresses or VLAN IDS that are respectively applied to the processes executed by any of the processing units PU 142-1, the SPU 142-2, and the SPU 142-3 and the information on ID(S) of SNR(S) set on these processing units are supplied to the table-managing unit 204. The table-managing unit 204 can produce or update the table shown in FIG. 7, 10 or 12.

It is to be noted that the above processing series may be performed by hardware or software. Namely, the above network interface card 101 may be configured as an apparatus of processing information in which the software is installed to perform the above processing series. If the above processing series is performed by software, program(s) constituting this software may be installed through a network such as the Internet or a recording medium such as removable medium.

In an embodiment, an apparatus for processing information (for example, the network interface card 101 shown in FIG. 8) in which plural processors (for example, the PU 142-1, the SPU 142-2, and the SPU 142-3 shown in FIG. 6) respectively execute separate operating systems to process data that has been received from a network is provided. The apparatus includes a receiving device (for example, the reception unit 201 shown in FIG. 8) that receives the data in predetermined units from the network, an analyzing device (for example, the address-analyzing unit 202 shown in FIG. 8) that analyzes identification data added to the data received by the receiving device, a maintaining device (for example, the table-managing unit 204 shown in FIG. 8) which maintains a table that relates the identification data to information on identification of an interrupt register (for example, the SNR 141-1, the SNR 141-2, or the SNR 141-3 shown in FIG. 6) in each of the processors that execute the operating systems, and interrupting device (for example, the interrupting unit 203 shown in FIG. 8) that allows interrupt processing to any of the processors to occur by writing the data received with the receiving device into the interrupt register that is related to the identification data, which is identified on the based of the table maintained by the maintaining device, analyzed by the analyzing device.

In such an apparatus, the plural processors may respectively execute a single operating system (for example, the OS 143 shown in FIG. 14) to perform separate processes (for example, the processes 151-1, 151-2, and 151-3 shown in FIG. 14) and the maintaining device may maintain a table that relates the identification data to information on identification of an interrupt register in each of the processors that perform the processes.

As another embodiment, a method of processing information for an apparatus of processing information (for example, the network interface card 101 shown in FIG. 8) in which plural processors (for example, the PU 142-1, the SPU 142-2, and the SPU 142-3 shown in FIG. 6) respectively execute separate operating systems to process data that has been received from a network is provided. The method includes the steps of receiving the data in predetermined units from the network (for example, the processing at step S101 shown in FIG. 9), analyzing identification data added to the data received by the receiving device (for example, the processing at step S102 shown in FIG. 9), based on a table that relates the identification data to information on identification of an interrupt register (for example, the SNR 141-1, the SNR 141-2, or the SNR 141-3 shown in FIG. 6) in each of the processors that execute the operating systems, identifying the interrupt register that is related to the analyzed identification data (for example, the processing at step S103 shown in FIG. 9), and allowing interrupt processing to any one of the processors to occur by writing the received data into the identified interrupt register(for example, the processing at step S 104 shown in FIG. 9).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An information processing apparatus comprising:
    a first processor configured to communicate with a first interrupt register, said first processor configured to execute a first operating system;
    a second processor configured to communicate with a second interrupt register, said second processor configured to execute a second operating system; and
    an interface device configured to communicate with said first processor and said second processor, said interface device including:
    (a) a receiver;
    (b) a memory device which stores a table including a plurality of predetermined fields, each of the predetermined fields indicating a correspondence between identification data and one of an identification of said first interrupt register and an identification of said second interrupt register; and
    (c) a third processor configured to operate with the receiver and the memory device to:
        (i) receive data from a network, said received data including the identification data, the identification data including destination information for said received data, wherein the received data corresponds to one of the first operating system and the second operating system based on the destination information of the identification data;
        (ii) analyze said identification data;
        (iii) determine whether the analyzed identification data corresponds to the identification of the first interrupt register or the identification of the second interrupt register based on one of the predetermined fields of said table;
        (iv) if the analyzed identification data is associated with the identification of the first interrupt register:
            (A) cause interrupt processing to occur by writing the received data into said first interrupt register; and
            (B) if the first operating system is available, notify said first processor of said interrupt processing; and
        (v) if the analyzed identification data is associated with the identification of the second interrupt register:
            (A) cause interrupt processing to occur by writing the received data into said second interrupt register; and
            (B) if the second operating system is available, notify said second processor of said interrupt processing.

2. The information processing apparatus of claim 1, wherein:
    (a) the received data includes an Internet protocol (IP) packet; and
    (b) the identification data includes a destination Internet protocol address of the IP packet.

3. The information processing apparatus of claim 1, wherein:
    (a) the received data includes a frame in a data link layer; and
    (b) the identification data includes a destination media access control (MAC) address of the frame.

4. The information processing apparatus of claim 1, wherein:
    (a) the received data includes a frame of Ethernet, said frame being suitable for the IEEE 802.1Q standard; and
    (b) the identification data includes a virtual local area network identification included in a tag of the frame.

5. The information processing apparatus of claim 1, wherein the third processor is configured to identify which of the first and second operating systems the received data is available for based on one of the predetermined fields of said table.

6. The information processing apparatus of claim 1, wherein the interface device is a network interface card.

7. An information processing apparatus in which an interface device communicates with plural processors, the plural processors including a first processor and a second processor, said first processor being configured to execute a first operating system and communicate with a first interrupt register, said second processor being configured to execute a second operating system and communicate with a second interrupt register, said information processing apparatus comprising:
    a memory device which stores a table including a plurality of predetermined fields, each of the predetermined fields indicating a correspondence between identification data and one of an identification of said first interrupt register and an identification of said second interrupt register;

a receiving device configured to receive data in predetermined units from the network, said received data including said identification data, said identification data including destination information for said received data, wherein the received data corresponds to one of the first operating system and the second operating system based on the destination information of said identification data;

an analyzing device configured to: (i) analyze said identification data added to the data received by the receiving device, and (ii) determine whether the analyzed identification data corresponds to the identification of the first interrupt register or the identification of the second interrupt register based on one of the predetermined fields of said table; and an interrupting device configured to cause interrupt processing to occur, wherein:

(i) if the analyzed identification data is associated with the identification of the first interrupt register:
  (a) said interrupting device is configured to cause said interrupt processing by writing the received data into the first interrupt register, and
  (b) if the first operating system is available, notify said first processor of said interrupt processing; and (ii) if the analyzed identification data is associated with the identification of the second interrupt register:
  (a) said interrupting device is configured to cause said interrupt processing by writing the received data into the second interrupt register, and
  (b) if the second operating system is available, notify said second processor of said interrupt processing.

8. The information processing apparatus of claim 7, wherein the analyzing device identifies which of the first and second operating systems the received data is available for based on one of the predetermined fields of said table.

9. The information processing apparatus of claim 7, wherein the interface device is a network interface card.

10. A method of processing information for an information processing apparatus, said method comprising:
  providing a first processor configured to communicate with a first interrupt register, said first processor configured to execute a first operating system;
  providing a second processor configured to communicate with a second interrupt register, said second processor configured to execute a second operating system;
  providing an interface device configured to communicate with said first processor and said second processor, said interface device including: (a) a receiver; (b) a memory device; and (c) a third processor;
  causing the memory device to store a table including a plurality of predetermined fields, each of the predetermined fields indicating a correspondence between identification data and one of an identification of said first interrupt register and an identification of said second interrupt register;
  causing the receiver to receive data from a network, said received data including the identification data, the identification data including destination information for said received data, wherein the received data corresponds to one of the first operating system and the second operating system;
  causing the third processor to analyze said identification data;
  causing the third processor to determine whether the analyzed identification data corresponds to the identification of said first interrupt register or the identification of said second interrupt register based on one of the predetermined fields of said table;

if the analyzed identification data is associated with the identification of the first interrupt register:
    (i) causing the third processor to cause interrupt processing to occur by writing the received data into said first interrupt register, and
    (ii) if the first operating system is available, causing the third processor to notify said first processor of said interrupt processing; and if the analyzed identification data is associated with the identification of the second interrupt register:
    (i) causing the third processor to cause interrupt processing to occur by writing the received data into said second interrupt register, and
    (ii) if the second operating system is available, causing the third processor to notify said second processor of said interrupt processing.

11. A computer program product stored on a computer-readable medium including executable instructions that when executed by a processor performs steps for processing information of an information processing apparatus, the plural processors including a first processor and a second processor, said first processor being configured to execute a first operating system and communicate with a first interrupt register, said second processor being configured to execute a second operating system and communicate with a second interrupt register, said steps comprising:

(a) causing a receiver device to receive data in predetermined units from a network, said received data including identification data, the identification data including destination information for said received data, wherein the received data corresponds to one of the first operating system and the second operating system;
  (b) causing a memory device to store a table including a plurality of predetermined fields, each of the predetermined fields indicating a correspondence between the identification data and one of an identification of said first interrupt register and an identification of said second interrupt register;
  (c) causing a third processor to analyze said identification data;
  (d) causing the third processor to determine whether the analyzed identification data corresponds to the identification of said first interrupt register or the identification of said second interrupt register based on one of the predetermined fields of said table;
  (e) if the analyzed identification data is associated with the identification of the first interrupt register:
    (i) causing the third processor to cause interrupt processing to occur by writing the received data into said first interrupt register, and
    (ii) if the first operating system is available, cause the third processor to notify said first processor of said interrupt processing; and
  (f) if the analyzed identification data is associated with the identification of the second interrupt register:
    (i) causing the third processor to cause interrupt processing to occur by writing the received data into said second interrupt register, and
    (ii) if the second operating system is available, cause the third processor to notify said second processor of said interrupt processing.

12. A recording medium configured to record a computer program product including executable instructions that when executed by a processor performs steps for processing information of an information processing apparatus, the plural processors including a first processor and a second processor said first processor being configured to execute a first operating system and communicate with a first interrupt register, said second processor being configured to execute a second operating system and communicate with a second interrupt register, said method comprising:

(a) causing a receiver device to receive data in predetermined units from a network, said received data including identification data, the identification data including destination information for said received data, wherein the received data corresponds to one of the first operating system and the second operating system;

(b) causing a memory device to store a table including a plurality of predetermined fields, each of the predetermined fields indicating a correspondence between the identification data and one of an identification of said first interrupt register and an identification of said second interrupt register;

(c) causing a third processor to analyze said identification data;

(d) causing the third processor to determine whether the analyzed identification data corresponds to the identification of said first interrupt register or the identification of said second interrupt register based on one of the predetermined fields of said table;

(e) if the analyzed identification data is associated with the identification of the first interrupt register:
 (i) causing the third processor to cause interrupt processing to occur by writing the received data into said first interrupt register, and
 (ii) if the first operating system is available, cause the third processor to notify said first processor of said interrupt processing; and (f) if the analyzed identification data is associated with the identification of the second interrupt register:
 (i) causing the third processor to cause interrupt processing to occur by writing the received data into said second interrupt register, and
 (ii) if the second operating system is available, cause the third processor to notify said second processor of said interrupt processing.

* * * * *